US006983289B2

(12) United States Patent
Commons et al.

(10) Patent No.: US 6,983,289 B2
(45) Date of Patent: Jan. 3, 2006

(54) AUTOMATIC IDENTIFICATION OF DVD TITLE USING INTERNET TECHNOLOGIES AND FUZZY MATCHING TECHNIQUES

(75) Inventors: Christopher Commons, Indianapolis, IN (US); Piero Madar, Indianapolis, IN (US)

(73) Assignee: Digital Networks North America, Inc., Santa Clara, CA (US)

( * ) Notice: Subject to any disclaimer, the term of this patent is extended or adjusted under 35 U.S.C. 154(b) by 548 days.

(21) Appl. No.: 10/002,627

(22) Filed: Dec. 5, 2001

(65) Prior Publication Data

US 2002/0069195 A1 Jun. 6, 2002

Related U.S. Application Data

(60) Provisional application No. 60/251,023, filed on Dec. 5, 2000.

(51) Int. Cl.
*G06F 17/30* (2006.01)

(52) U.S. Cl. .......................... 707/104.1; 707/3; 707/10; 707/100; 707/203; 386/69; 386/105; 705/50; 705/52; 709/201; 709/202; 717/100; 717/140

(58) Field of Classification Search ..................... 707/3, 707/6, 10, 100, 104.1, 203, 101; 386/69, 386/95, 98, 105, 106, 125; 705/50, 52, 77, 705/26; 709/201, 202, 217, 223, 225, 227, 709/238; 717/100, 140; 369/30.4, 35, 95, 369/98

See application file for complete search history.

(56) References Cited

U.S. PATENT DOCUMENTS

| | | | | |
|---|---|---|---|---|
| 6,012,112 A | | 1/2000 | Brase et al. | |
| 6,031,795 A | | 2/2000 | Wehmeyer | |
| 6,034,925 A | | 3/2000 | Wehmeyer | |
| 6,035,329 A | | 3/2000 | Mages et al. | |
| 6,061,306 A | | 5/2000 | Buchheim | |
| 6,104,334 A | | 8/2000 | Allport | |
| 6,131,129 A | | 10/2000 | Ludtke et al. | |
| 6,131,130 A | | 10/2000 | Van Ryzin | |
| 6,138,175 A | | 10/2000 | deCarmo | |
| 6,154,773 A | | 11/2000 | Roberts et al. | |
| 6,161,132 A | | 12/2000 | Roberts et al. | |
| 6,356,914 B1 | * | 3/2002 | deCarmo et al. | 707/104.1 |
| 6,377,518 B1 | * | 4/2002 | Auwens et al. | 369/30.04 |

OTHER PUBLICATIONS

CEDIA, "Electronic Lifestyles Awards for Manufactures Excellence" Entry for Best Video Product, PowerPlay, pp. 1–4, Sep. 1999.

PowerPlay "The Ultimate DVD Source".

* cited by examiner

*Primary Examiner*—Shahid Alam
*Assistant Examiner*—Fred Ehichioya
(74) *Attorney, Agent, or Firm*—McDonnell Boehnen Hulbert & Berghoff LLP

(57) ABSTRACT

An iterative search technique is used to quickly and accurately locate information in a database, such as one storing information about digital versatile discs (DVDs). First, a presumably unique search key is generated for an unidentified DVD and compared with corresponding keys in a database. If no match is found progressively less specific information is used to generate a series of search keys that are similarly compared with corresponding keys in the database. If at least one possibly matching record is found, it is determined whether the best matching record can be considered a match, otherwise, less specific information is used to search for a match until predefined least specific information is used.

12 Claims, 6 Drawing Sheets

AUTOMATIC IDENTIFICATION OF DVD TITLE USING INTERNET TECHNOLOGIES AND FUZZY MATCHING TECHNIQUES

CROSS-REFERENCE TO RELATED APPLICATION(S)

This application is related to and claims priority to the U.S. provisional patent application entitled AUTOMATIC IDENTIFICATION OF DVD TITLE USING INTERNET TECHNOLOGIES AND FUZZY MATCHING TECHNIQUES, having Ser. No. 60/251,023, by Christopher P. Commons and Piero Madar, filed Dec. 5, 2000 and incorporated by reference herein.

BACKGROUND OF THE INVENTION

1. Field of the Invention

The present invention is directed to searching for items in a database and, more particularly, to searching for information about a digital versatile disc based on the contents of the discs.

2. Description of the Related Art

One common task in data mining and pattern recognition is to extract specific records from a large database given a finite set of qualifiers. The technique used to accomplish this task are selected from among many available techniques based upon characteristics of the data being searched and the data that provides the search key(s). Some types of data have been searched for decades, e.g., census data, tax return data, data obtained from intelligence gathering, etc. However, as new sets of data are generated, the techniques used must be selected or modified for that particular set of data.

Digital video or versatile discs (DVDs) were first produced in late 1996 and by the end of 1997 there were fewer than 700 different DVDs available. By the end of 2000, there were over 10,000 different DVD available for Region 1 (U.S., Canada and U.S. Territories) and 15,000 in all regions. As of Dec. 4, 2001, there were over 15,000 in Region 1 alone. As a result of this recent, fast growth in records that could be stored in a DVD database, the unique characteristics of searching for DVD data are only now being identified. On the other hand there is a significant need for the information that could be stored in a DVD database, at least by owners of DVD changers, because the vast majority of existing DVDs do not store a title in text format.

Following is a list of some of the information which can be stored as text on a DVD, including the title of the DVD. The abbreviations for this information are used in the description of the invention.

DVD VIDEO SPECIFICATIONS FOR READ-ONLY DISC, PART 3, VERSION 1.12 JULY 2000

VMGI—Video Manager Information.
VMGI_MAT—Video Manager Information Management Table
TT_SRPT_SA—Start Address of Title Search Pointer Table
VTS_Ns—Number of Video Title Sets
TT_SRPT—Title Search Pointer Table
TT_SRPT_Ns—Number of Title Search Pointers
TT_SRP—Title Search Pointer
PTT_Ns—Part_of_Titles
VTSN—Video Title Set number
VTS_TTN—Video Title Set Title number
VTSI—Video Title Set Information
VTS_PTT_SRPT_SA—Start Address of Video Title Set Part_of_Titles Search Pointer VTS_PGCIT_SA—Start Address of Program Chain Information Table
VTS_PTT_SRPT—Video Title Set Part_of_Titles Search Pointer
TTU_SA—Start Address of Title Unit
TTU SRP—Title Unit Search Pointer
PTT_SRP—Part of Titles Search Pointer
PGCN—Program Chain Number
PGN—Program Number
VTS_PGCIT—Video Title Set Program Chain Information Table
VTS_PGCI_SRP—Video Title Set Program Chain Information Search Pointer
VTS_PGCI_SA—Start Address of Video Title Set Program Chain Information
VTS_PGCI—Video Title Set Program Chain Information
PGCI—Program Chain Information
PGCI_GI—Program Chain Information General Information
PGC_CNT—Program Chain Contents
C_PBIT_SA—Start Address of Cell Playback Information Table
PGC_PGMAP_SA—Start Address of PGC_PGMAP
C_PBIT—Cell Playback Information Table
C_PBI—Cell Playback Information
C_PBTM—Cell Playback Time Now that DVD changers holding 100 discs or more are becoming available, the same problem experienced with CD changers holding hundreds of discs is being experienced. It is difficult for a user to identify a desired disc without supplemental information stored in a searchable database. A simple list of titles is a bare minimum and it is desirable to have additional information, including information that cannot be obtained from the discs themselves, such as a description, synopsis, rating, genre, performers, directors and other production staff, cover art, etc. Systems displaying such information stored in databases, such as TUNEBASE from Escient are known for CDs and can be adapted for DVDs. However, it is desirable to avoid manual operations required to select information in a database containing 10,000 to 15,000 or more records, particularly when there are often several similar records, such as when a DVD title is released several times in a special edition, directors cut, etc.

SUMMARY OF THE INVENTION

It is an aspect of the present invention to provide a method and system for automatically identifying DVDs using a database of available DVDs.

Another aspect of the present invention is to provide a method of locating information in a database using an iterative process starting with a unique identifier and using increasingly less specific search keys, until a predefined least specific information is used.

A further aspect of the present invention is to use hash coding of data on which such searches are based.

Yet another aspect of the present invention is to provide a method for extracting the unique data from the DVD consisting of the number of titles, chapters per title and frames per chapter.

The above aspects can be attained by a method of finding at least one record in a database corresponding to a digital versatile disc, including receiving unique information about an unidentified digital versatile disc, including at least one of a title of the unidentified digital versatile disc, a volume name of the unidentified digital versatile disc, time stamp information for creation of a master of the unidentified digital versatile disc, a number of titles on the unidentified digital versatile disc, a number of chapters per title on the unidentified digital versatile disc, and a number of frames per chapter on the unidentified digital versatile disc; and identifying possibly matching records in a database of information about digital versatile discs using the unique information from the unidentified digital versatile disc.

The above aspects can also be attained by a method of searching for a match in a database, including obtaining a unique search key based on hash coding of uniquely identifying information from data to be matched with a record in the database; using the unique search key to search for a matching record in the database; obtaining a non-unique search key based on hash coding of non-uniquely identifying information from the data to be matched, if no match is found using the unique search key; using the non-unique search key to search for at least one possibly matching record in the database; and repeating the obtaining and using of non-unique search keys based on hash coding of progressively less specific information from the data to be matched, each time no possibly matching records are found, until predefined least specific information is used.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention may be implemented in many different ways depending on the location of the database(s) to be searched relative to the source of the search key(s) used to locate information in the database. In the embodiment described below, the search keys are obtained from a DVD containing at least one video and the information defined by the DVD Specifications for Read-Only Disc: Part 3 Video Specifications Version 1.12 which are listed above. Both a local database stored in a device in close proximity to the disc and a remote database accessed via a communication network may be searched. However, aspects of the invention may be useful in many other situations, including a database that is stored only locally or remotely, or distributed over a network. Furthermore, the source of the search keys is not limited to DVDs with video content, but other sources of search keys, even manual input, could be used.

Figure 1:
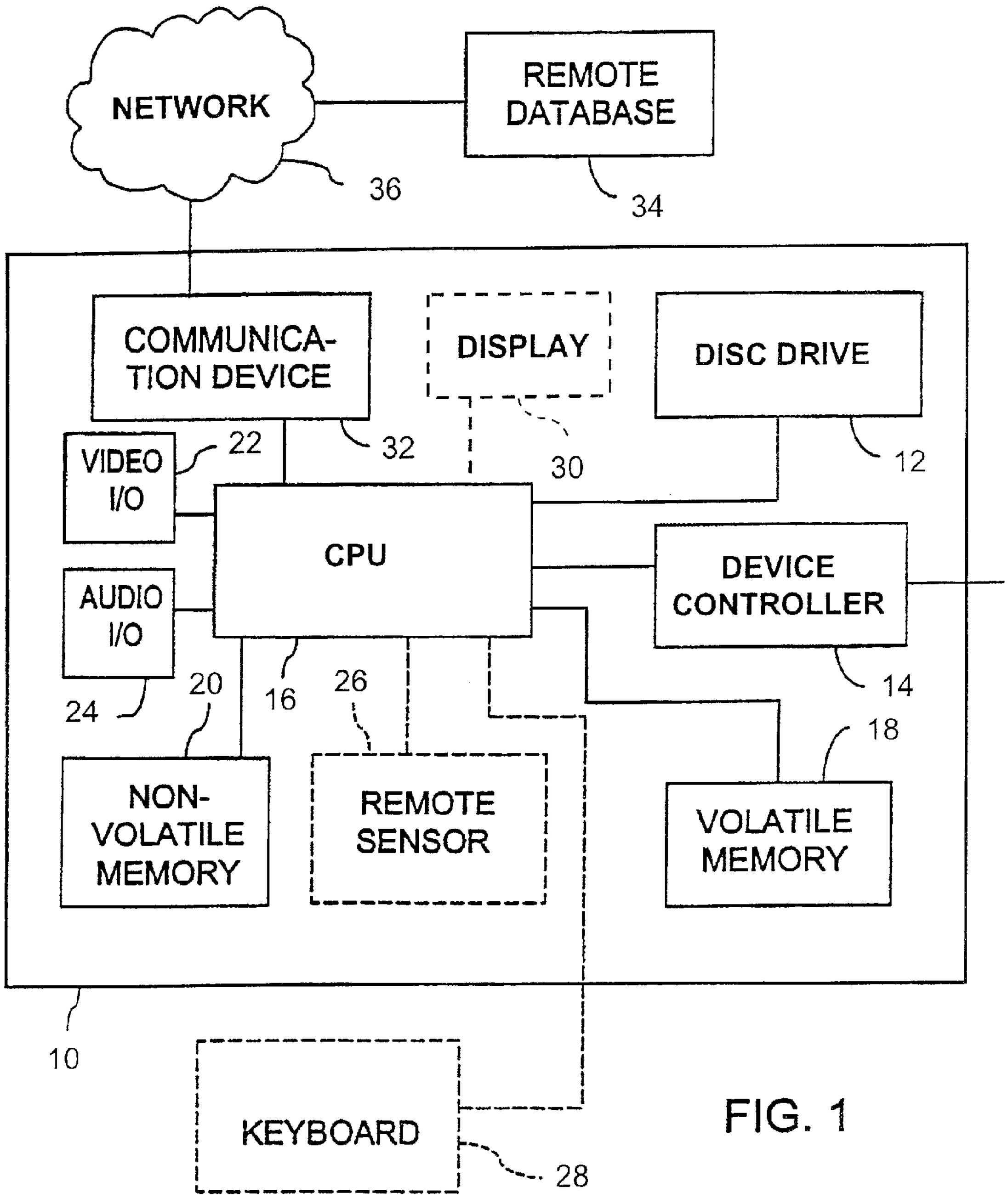
FIG. 1 is a block diagram of a system according to the present invention

A block diagram of an exemplary system to which the present invention can be applied is illustrated in FIG. 1. A local device 10 may include an internal disc drive 12 or an external device controller 14 for connection to external disc drives (not shown). In either case (or both cases if both are included) information from a DVD disc is provided to CPU 16 to generate search keys. In most systems in which the present invention would be implemented, local device 10 will also include volatile memory 18, such as random access memory (RAM) and nonvolatile memory 20, such as a hard drive. In the exemplary embodiment, local device 10 also includes video input/output 22 and audio input/output 24 which at least provide for output of the video and audio contents of the DVDs. Local device 10 is likely to also include components for user input and output which are represented by dashed lines in FIG. 1, because they are not closely related to the essential features of the present invention which is automatic identification of DVDs. Remote sensor 26 and keyboard 28 receive input from a user, either wirelessly via remote sensor 26 or through keyboard 28 whether directly connected or not. Display 30 may be mounted on the exterior of an enclosure containing the other components illustrated in local device 10. Alternatively or in addition, information may be displayed to the user on an external device coupled to video input/output 22 or by speech synthesis or recorded audio using audio input/output 24.

Nonvolatile memory 20 may be used to store only discs that have been identified or may also store a database of popular discs. However, even if the entire database for a region were stored in nonvolatile memory 20 which might require so much memory that it would be unlikely, some way of updating the database would be required as new discs are released. Although a data DVD could be used to distribute updates, in the preferred embodiment, local device 10 includes communication device 32 to access remote database 34 via network 36 to automatically obtain the most recent updated information without shipping costs or requiring manual operations by users. As a result, nonvolatile memory 20 is only required to be large enough to store a single user's collection of DVDs which is likely to be at most in the hundreds, rather than tens of thousands.

Figure 2A:
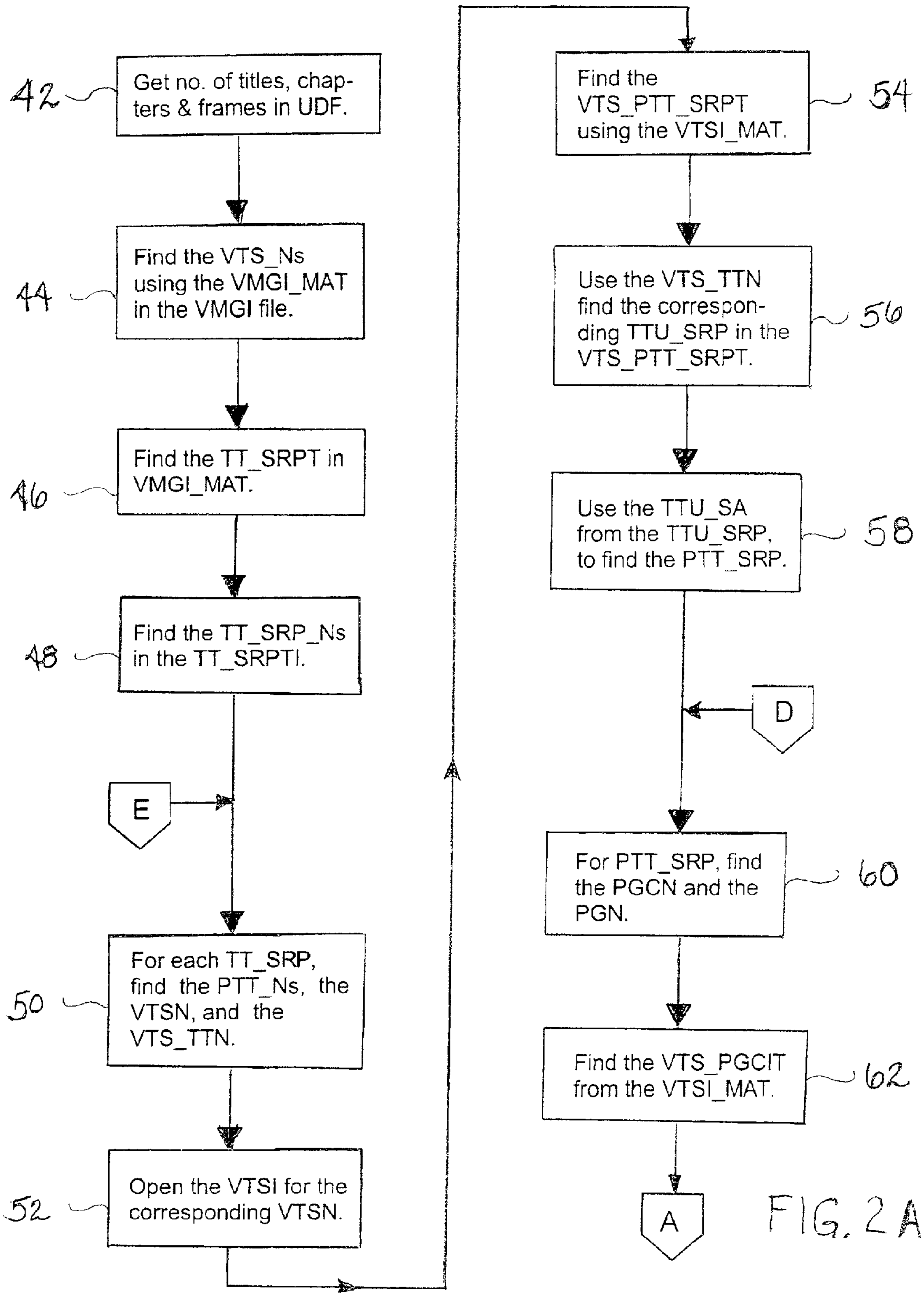
FIGS. 2A–2C are a flowchart of a method for obtaining data from a DVD.
Figure 2B:
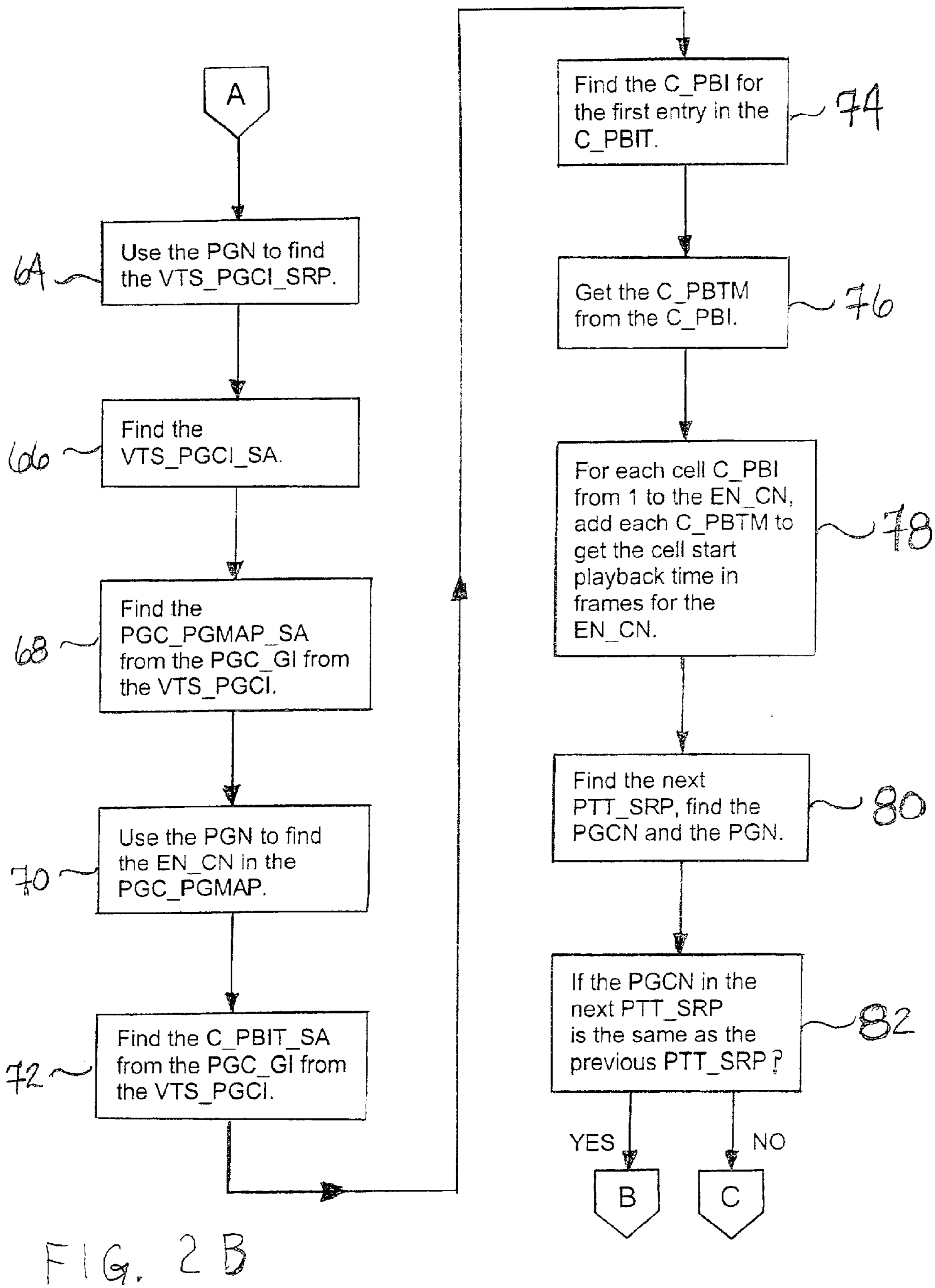
Figure 2C:
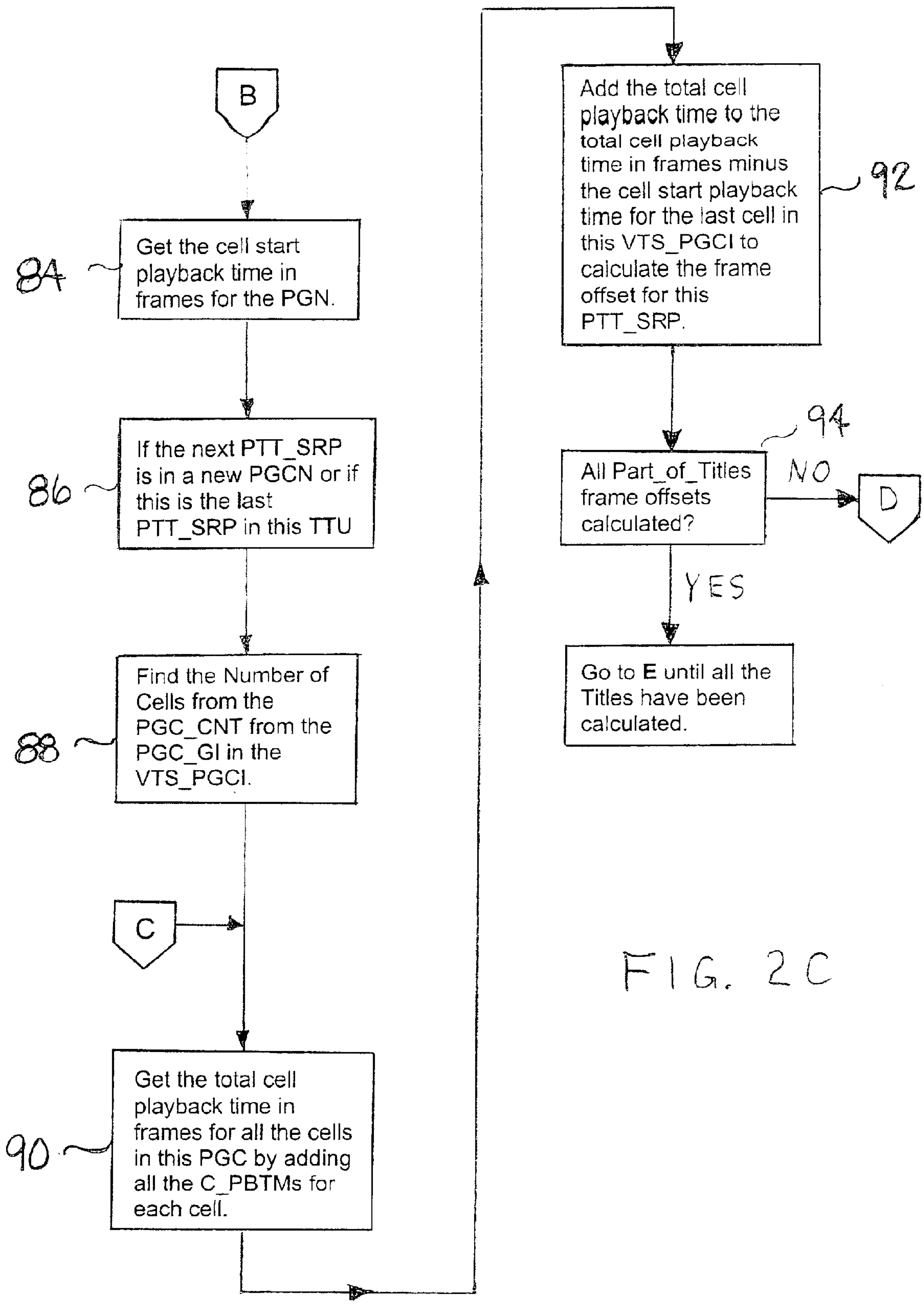

Regardless of whether the database being searched is stored locally or remotely, the method illustrated in FIGS. 2A–2C may be used to obtain information from a DVD to generate search keys. CPU 16 causes disc drive 12 or external device controller 14 to access 42 the Universal Disk Format (UDF) area on a DVD to obtain the number of titles, chapters and frames which are used to generate a unique search key, as described below. If no match is found for the unique search key, the video manager information management table (VMGI_MAT) in the video manager information (VMGI) file on the DVD and can be used to find 44 the number of video title sets (VTS_Ns) and the title search pointer table (TT_SRPT) can be found 46 therein. CPU 16 also finds 48 the number of title search pointers (TT_SRP_Ns) in the title search pointer table information (TT_SRPTI).

After the above information is obtained, for each title search pointer (TT_SRP) CPU 16 finds 50 the Part_of_Titles (PTT_Ns), video title set number (VTSN) and video title set title number (VTS_TTN). The VTSN is used to open 52 corresponding video title set information (VTSI) which contains a video title set information management table (VTSI_MAT). Using the VTSI_MAT, CPU 16 finds 54 the video title set Part_of_Titles search pointer (VTS_PTT_SRPT). Next, the VTS_TTN is used 56 to find the corresponding title unit search pointer (TTU_SRP) in the VTS_PTT_SRPT. The TTU_SRP includes a start address of title unit (TTU_SA) that is used 58 to find the Part_of_Titles search pointer (PTT_SRP).

With this information, the PTT_SRP is used to find 60 a program chain number (PGCN) and a program number (PGN). Next, the video title set program chain information table (VTS_PGCIT) is obtained 62 from the VTSI_MAT. The PGN obtained using the PTT_SRP is used 64 to find the video title set program chain information search pointer (VTS_PGCI_SRP). The VTS_PGCI_SRP is used to find 66 the start address of video title set program chain information (VTS_PGCI_SA) for video title set program chain information (VTS_PGCI). From the VTS_PGCI program chain information general information (PGCI_GI) is obtained from which the program chain program map start address (PGC_PGMAP_SA) can be found 68 for the program chain program map (PGC_PGMAP). The PGN is used 70 to find the entry cell number (EN_CN) in the PGC_PGMAP. Next, the start address of cell playback information table (C_PBIT_SA) is found 72 in the PGC_GI from the VTS_PGCI. In the first entry of the C_PBIT, cell playback information (C_PBI) is found 74. The cell playback time (C_PBTM) is obtained 76 from the (C_PBI). This is used to initialize a cumulative number to which is added 78 the C_PBTM in each cell C_PBI from one to the EN_CN to get the cell start playback time in frames for the EN_CN.

The next PTT_SRP is found 80 and used to obtain the corresponding PGCN and PGN. If it is determined 82 that the PGCN in the next PTT_SRP is the same as the previous PTT_SRP, the following steps are performed. Otherwise, the total cell playback time is obtained as described in the next paragraph. First, the cell start playback time in frames is obtained 84 for the PGN. If it is determined 86 that the next PTT_SRP is a new PGCN or if this is the last PTT_SRP in this title unit (TTU), the number of cells is found 88 from the program chain contents (PGC_CNT) from the PGC_GI in the VTS_PGCI.

The total cell playback time in frames is obtained 90 for all the cells in this PGC by adding all the C_PBTMs for each cell. The total cell playback time is added 92 to the total cell playback time in frames minus the cell start playback time for the last cell in this VTS_PGCI to calculate the frame offset for this PTT_SRP. If it is determined 94 that all Part_of_Titles frame offsets have not been calculated, processing returns to step 60. If they have all been calculated, processing returns 96 to step 50 for the next TT_SRP.

With the information obtained using the procedure in FIGS. 2A–2C, search keys can be generated on a variety of information to obtain additional data related to the DVD that is not stored on the DVD. For example, the title of the unidentified digital versatile disc (DVD), the volume name of the unidentified DVD, time stamp information for creation of a master of the unidentified DVD, the number of titles on the unidentified DVD, the number of chapters per title on the unidentified DVD and the number of frames per chapter on the unidentified DVD may be used in different steps of an iterative process to find a matching record in a large database of DVDs. The volume name of the unidentified DVD and the time stamp information for creation of a master of the unidentified DVD can be found in the Universal Disk Format (UDF) sectors of the unidentified DVD. On the other hand, the number of titles, chapters per title and frames per chapter are obtained from the video manager information (VMGI) and title set information (VTSI).

Figure 3A:
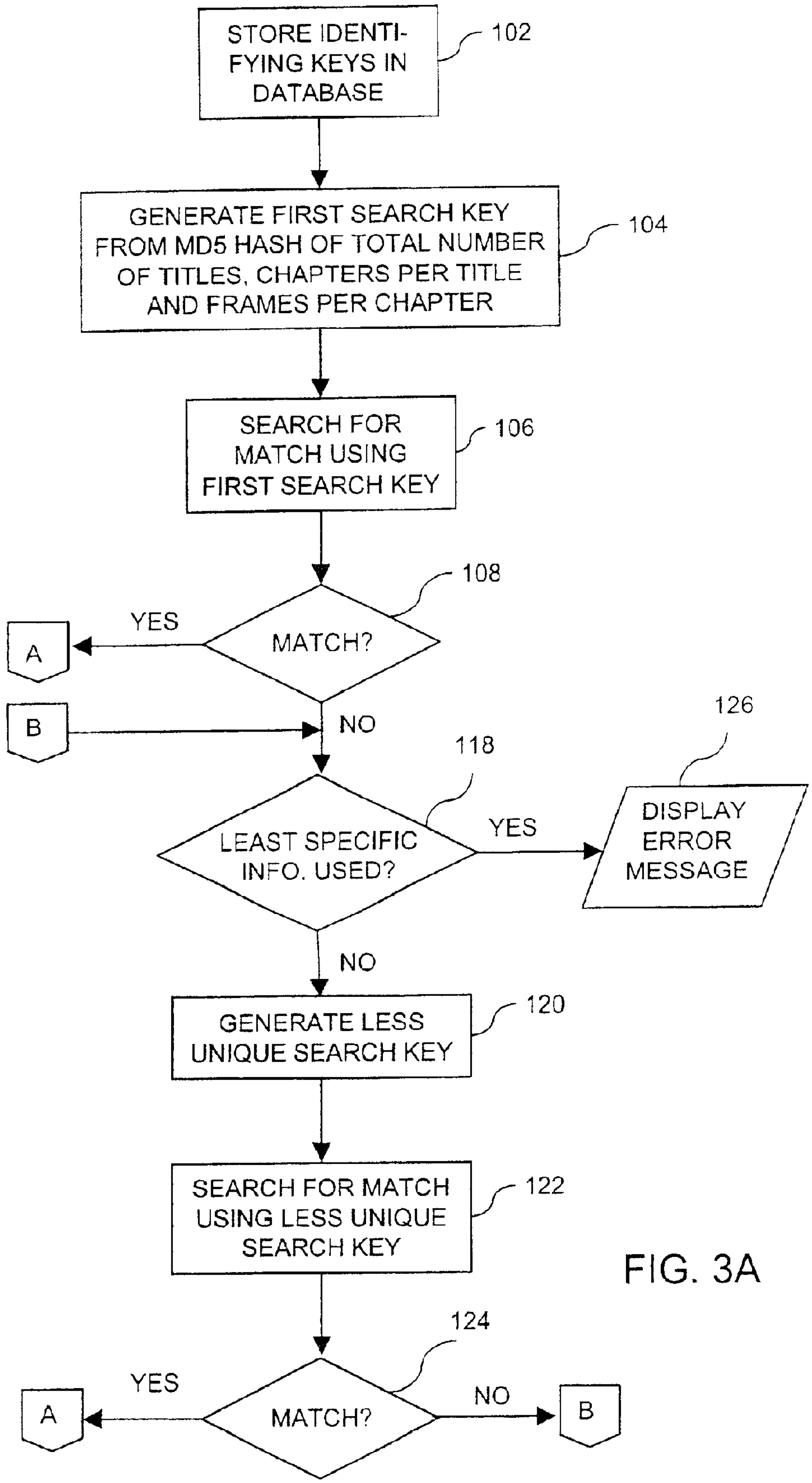
FIGS. 3A and 3B are a flowchart of a method according to the present invention.
Figure 3B:
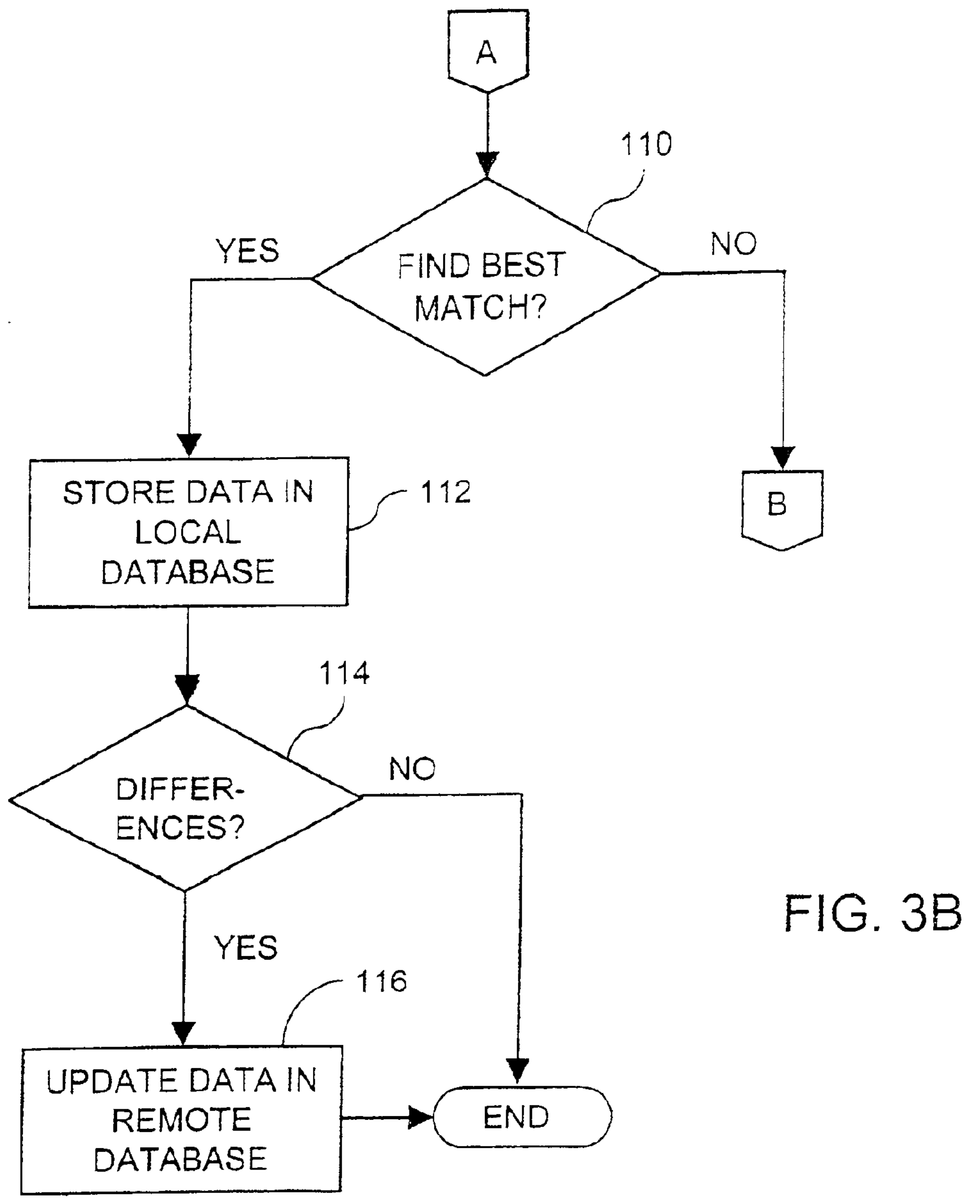

In the preferred embodiment an iterative process is used to find a matching database in the record as quickly and accurately as possible using the method illustrated in FIGS. 3A and 3B. In remote database 34, a set of identifying keys are stored 102 that are constructed in the manner described below for each of the search keys. A first search key which should be unique is generated 104 based on the total number of titles, chapters per title and number of frames per chapter. The first search key is used to search 106 for a matching record in the database. In the preferred embodiment, the unique search key is a hash code of at least a portion of this presumably uniquely identifying information. A message digest algorithm, such as MD5 is preferably used to produce the hash code.

If it is determined 108 that there is at least one possible match, the procedure illustrated in FIG. 3B is performed. First it is determined 110 whether there is a best match. Although the first identifying key should be unique, there is a possibility of duplicate or almost duplicate records in the database. Therefore, if more than one match is found, the number of titles and number of chapters per title of a corresponding DVD in each of the possibly matching records are compared with the number of titles and number of chapters per title of the unidentified DVD to find a best matching record. If none of the records match within predetermined criteria, the search continues using another key. If a best match is found and a database is maintained of the DVDs in possession of the user, at least some of the information from the general database is stored 112 (or flagged) in a database, e.g., in non-volatile memory 20, containing information about the user's DVDs. If any differences exist 114 between the number of titles and the number of chapters per title, but the differences are within the predetermined criteria, i.e., it is determined that the best matching record corresponds to the unidentified DVD, at least one of the number of titles and the number of chapters per title of the unidentified DVD is stored in the best matching record, to update 116 the information in remote database 34.

If it is determined 108 that no match is found, the search is repeated with progressively less specific information. Prior to the second search, it will be determined 118 that the least specific information has not been used. Therefore, a second (non-unique) search key is generated 120 based on non-uniquely identifying information to search 122 the database for at least one possibly matching record. In the preferred embodiment, the second search key is generated by concatenating a predetermined number of characters of the volume name and hash coded time stamp information that may be generated using the MD5 algorithm. Corresponding second identifying keys stored in the database records are compared 122 to identify possibly matching records. If at least one possible match is found 124, the procedure illustrated in FIG. 3B is performed to determine whether the best matching record is acceptable. If it is determined that the best matching record corresponds to the unidentified DVD, the local and remote databases are updated in a manner similar to that described above with respect to a match found using the first search key.

If no match is found using the second search key, a third search key is generated 120 using from the number of chapters and frames per chapter of the first title with the largest number of chapters on the unidentified DVD. Preferably, the hash code for the third search key is generated using the MD5 algorithm. Corresponding third identifying keys stored in the database records are compared 122 to identify possibly matching records. If at least one possibly matching record is found, the best matching record is selected and it is determined whether the best matching record corresponds to the unidentified DVD. If a match is found, the local and remote databases are updated as described above.

If no match is found using the third search key, a fourth search key is generated 120 using a hash code that is less unique than the hash code used in the third search key, but also uses the number of chapters and frames per chapter of the first title with the largest number of chapters on the unidentified DVD. Preferably, the hash code used in the fourth search key will permit the number of frames per chapter to vary by as many as 100 frames. Any known technique for generating fuzzy search keys may be used. Corresponding fourth identifying keys stored in the database records are compared 122 to identify possibly matching records. If at least one possibly matching record is found, the best matching record is selected and it is determined whether the best matching record corresponds to the unidentified DVD. If a match is found, the local and remote databases are updated as described above.

If the fourth search key does not produce a match, a fifth search key is generated 120 based on the title of the unidentified DVD stored in the VTSI for comparison 122 with the titles stored in the database. Fuzzy matching techniques may be used to match the titles. If at least one possibly matching record is found 124, the best matching record is determined using the procedure illustrated in FIG. 3B. In the preferred embodiment, the title comparison is the least specific test. Therefore, if there is no matching title, or all of the possibly matching records do not meet the criteria to be considered a match, the user is informed 126. The remote database provider may also receive information about a DVD that is not stored in the database.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of finding at least one record in a database corresponding to a digital versatile disc, comprising:

receiving unique information about an unidentified digital versatile disc, including at least one of a title of the unidentified digital versatile disc, a volume name of the unidentified digital versatile disc, time stamp information for creation of a master of the unidentified digital versatile disc, a number of titles on the unidentified digital versatile disc, a number of chapters per title on the unidentified digital versatile disc, and a number of frames per chapter on the unidentified digital versatile disc;

identifying possibly matching records in a database of information about digital versatile discs using the unique information from the unidentified digital versatile disc; and storing first identifying keys for the information in the database, each first identifying key having been generated based on the number of titles, the number of chapters per title and the number of frames per chapter, wherein said identifying comprises:

generating a first search key using the number of titles on the unidentified digital versatile disc, the number of chapters per title on the unidentified digital versatile disc, and the number of frames per chapter on the unidentified digital versatile disc; and using the first search key and the first identifying keys to identify the possibly matching records.

2. A method as recited in claim 1, further comprising:

comparing the number of titles and the number of chapters per title of a corresponding digital versatile disc in each of the possibly matching records with the number of titles and the number of chapters per title of the unidentified digital versatile disc to find a best matching record and to determine whether the best matching record corresponds to the unidentified digital versatile disc; and storing at least one of the number of titles and the number of chapters per title of the unidentified digital versatile disc in the best matching record if said comparing determines that the best matching record corresponds to the unidentified digital versatile disc and any differences exist between the number of titles and the number of chapters per title of the unidentified digital versatile disc and the best matching record.

3. A method as recited in claim 1, wherein each of the first search key and the first identifying keys is a 16 byte hash code generated by a message digest algorithm.

4. A method as recited in claim 1, further comprising storing second identifying keys for the information in the database, each second identifying key having been generated by concatenating a predetermined number of characters of a volume name and hash coded time stamp information, wherein said identifying further comprises:

generating a second search key by concatenating a predetermined number of characters of the volume name of the unidentified digital versatile disc, and a hash code derived from the time stamp information for creation of the master for the unidentified digital versatile disc; and using the second search key and the second identifying keys to identify the possibly matching records if no possibly matching records are found using the first search key and the first identifying keys.

5. A method as recited in claim 4, further comprising:

comparing the number of titles and the number of chapters per title of a corresponding digital versatile disc in each of the possibly matching records with the number of titles and the number of chapters per title of the unidentified digital versatile disc to find a best matching record and to determine whether the best matching record corresponds to the unidentified digital versatile disc; and storing at least one of the number of titles and the number of chapters per title of the unidentified digital versatile disc in the best matching record if said comparing determines that the best matching record corresponds to the unidentified digital versatile disc and any differences exist between the number of titles and the number of chapters per title of the unidentified digital versatile disc and the best matching record.

6. A method as recited in claim 4, further comprising storing third identifying keys for the information in the database, each third identifying key having been generated based on number of chapters and number of frames per chapter for a title having a largest number of chapters on a corresponding digital versatile disc, wherein said identifying further comprises:

generating a third search key using the number of chapters and the number of frames per chapter in a title having a largest number of chapters on the unidentified digital versatile disc; and using the third search key and the third identifying keys to identify the possibly matching records if no possibly matching records are found using the first and second search keys and the first and second identifying keys.

7. A method as recited in claim 6, further comprising:

comparing the number of titles and the number of chapters per title of a corresponding digital versatile disc in each of the possibly matching records with the number of titles and the number of chapters per title of the unidentified digital versatile disc to find a best matching record and to determine whether the best matching record corresponds to the unidentified digital versatile disc; and storing at least one of the number of titles and the number of chapters per title of the unidentified digital versatile disc in the best matching record if said comparing determines that the best matching record corresponds to the unidentified digital versatile disc and any differences exist between the number of titles and the number of chapters per title of the unidentified digital versatile disc and the best matching record.

8. A method as recited in claim 6, wherein each of the first and third search keys and the first and third identifying keys is a 16 byte hash code generated by a message digest algorithm.

9. A method as recited in claim 6, further comprising storing fourth identifying keys for the information in the database, each fourth identifying key having been generated based on the number of chapters and the number of frames per chapter for the title having the largest number of chapters on the corresponding digital versatile disc and using an approximation algorithm that identifies the information with less precision than the third identifying keys, wherein said identifying further comprises:

generating a fourth search key based on the number of chapters and the number of frames per chapter in a title having a largest number of chapters on the unidentified digital versatile disc and using the approximation algorithm; and using the fourth search key and the fourth identifying keys to identify the possibly matching records if no possibly matching records are found using the first, second and third search keys and the first, second and third identifying keys.

10. A method as recited in claim 9, further comprising selecting a best matching record from among a plurality of possibly matching records obtained by said identifying, based on a closest match between the number of frames per chapter of the unidentified digital versatile disc and the possibly matching records.

11. A method as recited in claim 10, further comprising:

comparing the number of titles and the number of chapters per title of the corresponding digital versatile disc for the best matching record with the number of titles and the number of chapters per title of the unidentified digital versatile disc to determine whether the best matching record corresponds to the unidentified digital versatile disc; and storing at least one of the number of titles and the number of chapters per title of the unidentified digital versatile disc in the best matching record if said comparing determines that the best matching record corresponds to the unidentified digital versatile disc and any differences exist between the number of titles and the number of chapters per title of the unidentified digital versatile disc and the best matching record.

12. A method as recited in claim 9, wherein said identifying further comprises comparing the title of the unidentified digital versatile disc with titles stored in the information in the database if no possibly matching records are found using the first through fourth search keys and the first through fourth identifying keys.

* * * * *